United States Patent
Barth et al.

[11] Patent Number: 6,150,799
[45] Date of Patent: Nov. 21, 2000

[54] POWER-SUPPLY CIRCUIT SUPPLIED BY AT LEAST TWO DIFFERENT INPUT VOLTAGE SOURCES

[75] Inventors: Michael Barth, Kirchheim/Teck; Dietmar Koehler, Wolfschlugen; Andrea Meroth-Lienkamp, Reutlingen; Bernd Mueller, Reutlingen; Steffen Lacher, Reutlingen, all of Germany

[73] Assignee: Robert Bosch GmbH, Stuttgart, Germany

[21] Appl. No.: 09/180,684
[22] PCT Filed: Mar. 4, 1998
[86] PCT No.: PCT/DE98/00622
§ 371 Date: Aug. 27, 1999
§ 102(e) Date: Aug. 27, 1999
[87] PCT Pub. No.: WO98/40803
PCT Pub. Date: Sep. 17, 1998

[30] Foreign Application Priority Data

Mar. 13, 1997 [DE] Germany .......................... 197 10 440

[51] Int. Cl.⁷ .................................................. G05F 1/40
[52] U.S. Cl. .............................................. 323/273
[58] Field of Search .................... 323/273, 315, 323/316, 349, 350; 307/43, 52, 71; 330/257, 261, 297

[56] References Cited

U.S. PATENT DOCUMENTS

| | | |
|---|---|---|
| 4,617,473 | 10/1986 | Bingham . |
| 5,103,157 | 4/1992 | Wright ................................. 323/275 |
| 5,430,365 | 7/1995 | Taylor et al. . |
| 5,929,623 | 7/1999 | Hoshino ................................ 323/315 |

FOREIGN PATENT DOCUMENTS

| | | |
|---|---|---|
| 0 316 781 | 5/1989 | European Pat. Off. . |
| 0 465 933 | 1/1992 | European Pat. Off. . |

OTHER PUBLICATIONS

U. Tietze et al., "Halbleiter–Schaltungstechnik", Feb. 19580 Springer Verlag, Berlin*, pp. 55–56.

Primary Examiner—Peter S. Wong
Assistant Examiner—Gary L. Laxton
Attorney, Agent, or Firm—Kenyon & Kenyon

[57] ABSTRACT

A power-supply circuit which makes available a voltage that is obtained from at least two input-voltage sources. Connected to each input-voltage source is a current mirror which makes a current available at a control input of an output transistor joint output transistor is connected, via decoupling diodes to the input-voltage sources. Decoupling of input-voltage sources is assured by output transistors which are interconnected at output. The power-supply circuit induces a small voltage difference between the output of the power-supply circuits and the voltage of the determining input-voltage source.

12 Claims, 2 Drawing Sheets

POWER-SUPPLY CIRCUIT SUPPLIED BY AT LEAST TWO DIFFERENT INPUT VOLTAGE SOURCES

BACKGROUND INFORMATION

A conventional power supply circuit is intended to be driven at a plurality of input-voltage sources which can have different voltages. The input-voltage sources cannot easily be interconnected. Therefore, a customary measure provides for the use of decoupling diodes, so that input-voltage source which has the higher voltage is connected to the further circuit, while the input-voltage source having the lower voltage is decoupled. The disadvantage of this known design approach is that the voltage difference at least occurring between one output of the power-supply circuit and the input-voltage source is increased by the forward voltage of one diode, in addition to the voltage difference occurring anyway in the power-supply circuit.

An object of the present invention is to specify a power-supply circuit which can be supplied from at least two different input-voltage sources, it is advantageous to provide as small a voltage difference as possible between the output of the power-supply circuit and the input-voltage source having the highest voltage.

SUMMARY OF THE INVENTION

A power-supply circuit according to the present invention includes a current mirror connected to each input-voltage source. The current mirror makes the current provided by one current source available at the control input of an output transistor. Using this measure, the control voltage of the output transistor can come near to the voltage of the input-voltage source. The voltage difference can be in the range of only 0.1 to 0.3 volts, which corresponds to the saturation voltage of a collector-emitter section of a transistor contained in the current mirror. The current mirrors are described in detail, e.g. in the reference book by U. Tietze and Ch. Schenk, "Halbleiter-Schaltungstechnik", (Semiconductor-Current Technology) 5th edition, 1980, pages 55–56. A current mirror makes a maximum current, which is preselected at one input-current terminal, available at one output-current terminal. The transformation ratio can be freely selectably predefined. An advantage of this feature is that there can be a difference in potential between the current flowing into the input-current terminal and the current flowing out of the output-current terminal. The current mirror must be connected to a power-supply terminal which must be able to make available the currents occurring in the current mirror, the voltage at the power-supply terminal determining the potential ratios.

According to a first embodiment of the circuit of the present invention, the at least two input-voltage sources are interconnected, via the conventional decoupling diodes, at an output transistor. Nevertheless, the voltage drop occurring is reduced due to the connection of the current mirror directly to the input-voltage source, so that, in addition to the voltage drop which occurs at the decoupling diodes, only a small voltage drop must be accepted at the output transistor. The voltage drop at the output transistor is determined by its saturation voltage of the emitter-collector section.

According to another embodiment of the power-supply circuit according to the present invention, an output transistor is allocated to each input-voltage source. The output transistors are interconnected at the output of the power-supply circuit. The output transistors take care of the necessary decoupling of the input-voltage sources. The power-supply circuit of the present invention according to this embodiment permits a particularly small voltage difference between the voltage present at the output of the power-supply circuit and the input-voltage source having the highest voltage. Due to the omission of the decoupling diodes, the minimal voltage difference falls to the forward voltage of the output transistors.

The power-supply circuit of the present invention provides a containment of a single current source which makes a preselected current available to the current mirrors. This measure permits cost-effective implementation. Furthermore, the maximum current which the power-supply circuit of the present invention can deliver is established by the current made available by the current source, the current transformation ratio of the current mirror, as well as of the current-amplification factor of the output transistor. The voltage-supply circuit can be made short-circuit-proof by circuit-engineering measures. To that end, the current is usually measured. If the current exceeds a predefined maximum value, an additional circuit element reduces the current at the output of the current mirror. The current input is independent of the number of input-voltage sources actually switched in.

Another embodiment of the present invention provides for setting the output voltage to a predefined value. A simple stabilization of the output voltage is made possible by clamping the control input of the output transistor to a predefined potential. Preferably, a limiter diode is suitable. One advantageous further feature of this embodiment provides for a closed control loop which compares the output voltage to a reference voltage. A stable output voltage is attainable using this measure.

The decoupling diodes required according to the first embodiment of the power-supply circuit of the present invention are preferably implemented as bipolar diodes which exhibit great reliability. Another embodiment implements the output transistors, which preferably have a NPN structure. This feature allows simple integration of the output transistors with the further electronic components on a silicon chip.

Another utilization of the power-supply circuit according to the present invention is in a motor vehicle. On one hand, instead of a single electrical-system voltage which is usually 12 to 24 V, efforts are taking place to provide a plurality of different electrical-system voltages. On the other hand, numerous electronic devices are installed in a modern motor vehicle which already contain power-supply circuits that can be used in the present case as input-voltage sources.

Additional advantageous refinements and further developments of the power-supply circuit according to the invention come to light from further dependent claims and from the following description.

BRIEF DESCRIPTION OF THE DRAWINGS

FIG. 1 shows a power-supply circuit 10 which makes an output voltage available at an output 11. The input voltage of power-supply circuit 10 is provided by various input-voltage sources. In the exemplary embodiment in FIG. 1, a first input-voltage source 12a and a second input-voltage source 12b are shown which are brought together, (e.g., connected via a first decoupling diode 13a and a second decoupling diode 13b, at a joint shared output transistor 14. Joint output transistor 14 is connected to output 11. A first current mirror 15a, whose power-supply terminal 16a is connected to first input-voltage source 12a, makes a current which is predefined by a current source 18 available at a control input 17 of joint output transistor 14. Therefore, current mirror 15a is connected with its output-current terminal 19a to control input 17.

Figure 1:
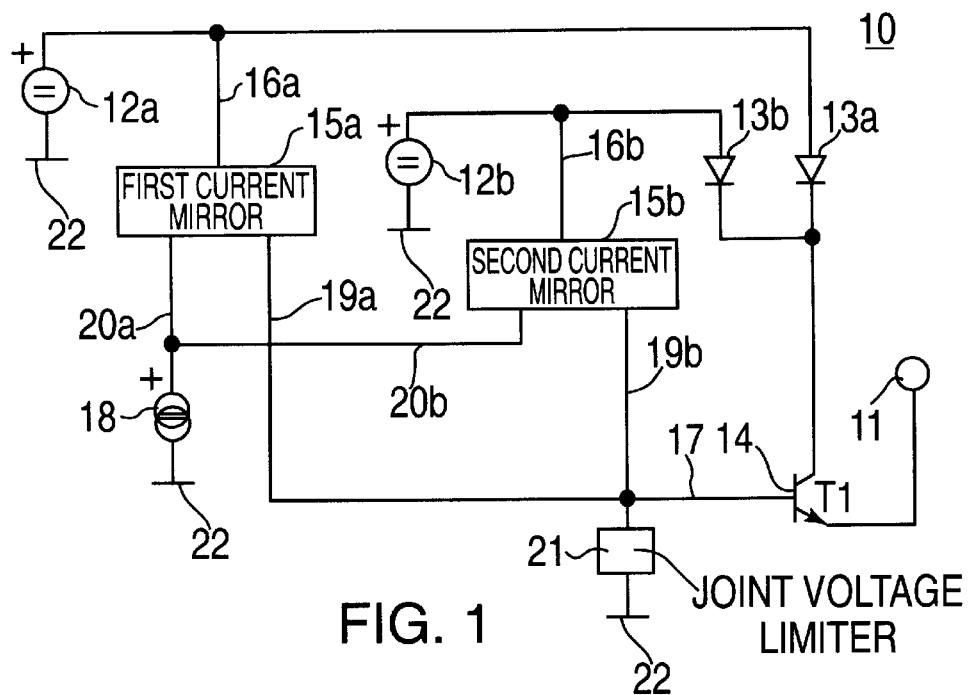
FIG. 1 show a circuit diagram of a first exemplary embodiment of a power-supply circuit according to the present invention.

Control input 17 of joint output transistor 14 is connected, furthermore, to an output-current terminal 19b of a second current mirror 15b, whose power-supply terminal 16b is connected to second input-voltage source 12b.

The two current mirrors 15a, 15b are each connected with their input-current terminals 20a, 20b to current source 18.

Control input 17 of joint output transistor 14 is connected via a joint voltage limiter 21 to a circuit frame (e.g., ground) 22.

Power-supply circuit 10, shown in FIG. 1, functions in the following way:

Power-supply circuit 10 makes available at output 11 a voltage which is obtained either from first or second input-voltage source 12a, 12b. The two input-voltage sources 12a, 12b are interconnected, via the two decoupling diodes 13a, 13b, at joint output transistor 14, and form an analog OR operation. Therefore, connected to output transistor 14 is that input-voltage source 12a, 12b which, given the polarity of decoupling diodes 13a, 13b shown in FIG. 1, makes available the higher voltage.

A current mirror 15a, 15b is provided for driving joint output transistor 14. Each input-voltage source 12a, 12b is connected, via the respective input-current terminal 16a, 16b, to a separate current mirror 15a 15b. Current mirror 15a 15b supplies to control input 17 of joint output transistor 14, a current which is predefined by current source 18. Current mirror 15a, 15b, whose detailed circuit implementation is described in the publication indicated above, mirrors the current, flowing through input-current terminal 20a, 20b into current mirror 15a, 15b, into output-current terminal 19a, 19b, the transformation ratio being freely selectable. Therefore, the maximum current which can flow into control input 17 of joint output transistor 14 is set by the current of current source 18, as well as by the adjusted transformation ratio. The maximum current which can be drawn from output 11 is set as a function of the current-amplification factor of joint output transistor 14. Power-supply circuit 10 of the present invention is short-circuit-proof.

One of the advantages of driving joint output transistor 14 by current mirror 15a, 15b, is that the current which is made available at control input 17 of joint output transistor 14 can have a different potential from the current delivered by current source 18. Due to the interface connection of current mirror 15a, 15b, via its power-supply terminal 16a, 16b, to input-voltage source 12a, 12b, the potential at control input 17 of joint output transistor 14 lies only slightly below the voltage of input-voltage source 12a, 12b. The voltage difference is a function of the implementation of current mirror 15a, 15b by circuit engineering. Given an implementation described above, the voltage difference corresponds to a saturation voltage of a collector-emitter section of a transistor, which can lie in the range of 0.1 V to 0.3 V. The voltage difference which occurs between control input 17 of joint output transistor 14 and output 11 must still be added to this voltage difference. If joint output transistor 14 is implemented using silicon technology, a voltage difference of approximately 0.7 V must still be added.

A further voltage drop occurs at decoupling diodes 13a, 13b which is a function of the implementation of the diodes. If bipolar silicon diodes are used, the additional voltage drop at decoupling diodes 13a, 13b can be up to 1 V. Since, however, the potential at control input 17 of joint output transistor 14 is considerably increased compared to the conventional devices, a lower voltage difference results all in all than could be attained until now.

The voltage at output 11 can be established with joint voltage limiter 21 which establishes the potential at control input 17 of joint output transistor 14. A limiter diode is suitable, e.g. a Zener diode. In the setting of the voltage of joint voltage limiter 21, in addition the voltage difference occurring between control input 17 and output 11 must be taken into account.

Figure 2:
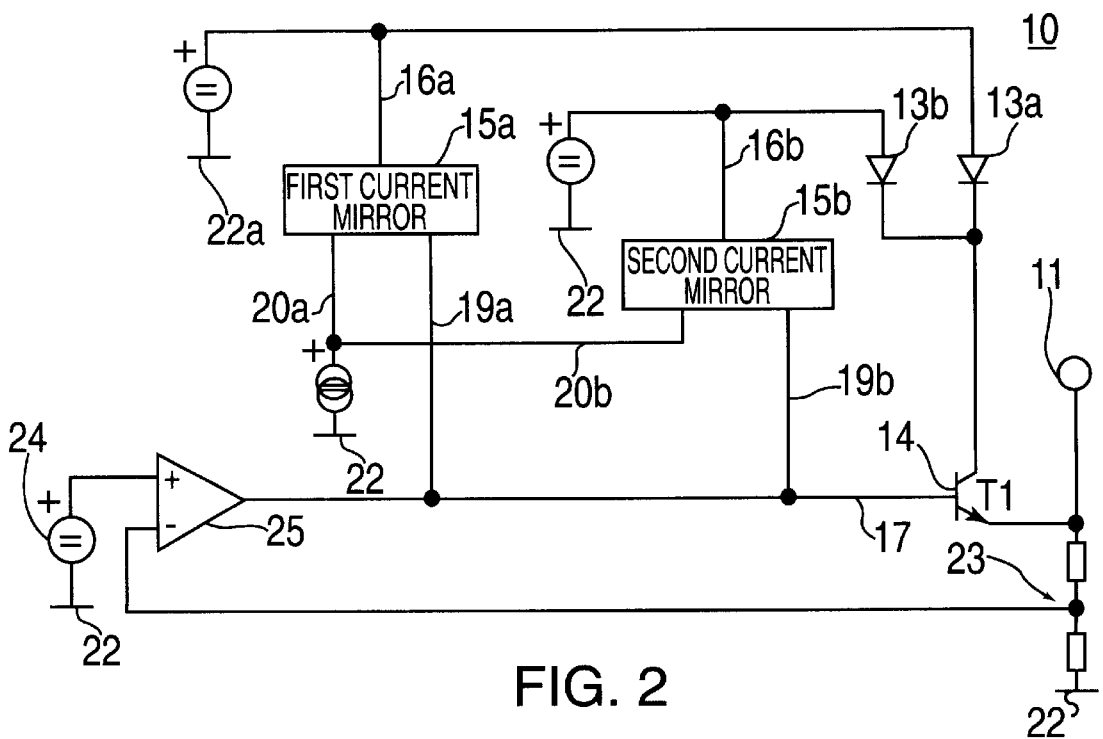
FIG. 2 show a circuit diagram of a second exemplary embodiment of the power-supply circuit according to the present invention.

FIG. 2 shows another embodiment of power-supply circuit 10 of the present invention. Those parts shown in FIG. 2 which correspond with the parts shown in FIG. 1 are denoted in each case by the same reference numerals. Instead of joint voltage limiter 21 shown in FIG. 1, provision is made for a voltage divider 23, a reference-voltage source 24, as well as a comparator 25. Voltage divider 23 and reference-voltage source 24 are each connected to comparator 25, whose output is connected to control input 17 of joint output transistor 14.

Compared to power-supply circuit 10 of the present invention shown in FIG. 1, the embodiment shown in FIG. 2 permits a closed-loop control of the voltage of power-supply circuit 10 made available at output 11 to a constant value which is established by reference-voltage source 24. A closed control loop is provided so that a high constancy of voltage can be achieved as a function of the wiring of comparator 25.

Figure 3:
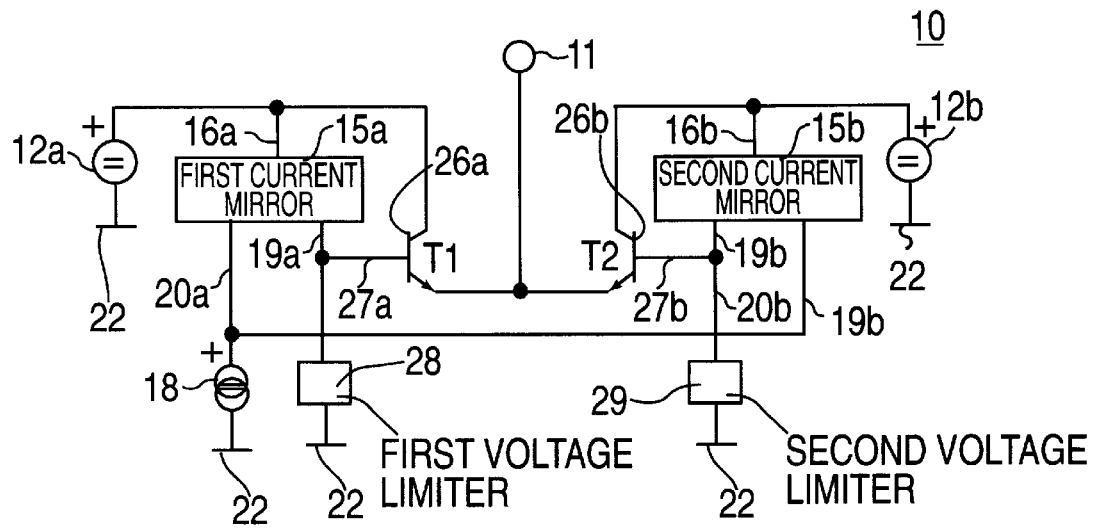
FIG. 3 show a circuit diagram of a third exemplary embodiment of the power-supply circuit according to the present invention.

FIG. 3 shows another embodiment of power-supply circuit 10 according to the present invention. Those parts shown in FIG. 3 which correspond with the parts shown in FIG. 1 are denoted in each case by the same reference numeral. A difference between the two embodiments is that, instead of joint output transistor 14 and decoupling diodes 13a, 13b, provision is made for a first output transistor 26a and a second output transistor 26b. First output transistor 26a is connected directly to first input-voltage source 12a, and second output transistor 26b is connected directly to second input-voltage source 12b. Both output transistors 26a, 26b are connected to output 11.

A control input 27a of first output transistor 26a is connected both to first current mirror 15a via its output-voltage terminal 19a, and to a first voltage limiter 28 that is connected to circuit frame 22. A control input 27b of second output transistor 26b is connected both to second current mirror 15b via its output-current terminal 19b, and to a second voltage limiter 29 which is connected to circuit frame 22.

A difference between power-supply circuit 10 of the present invention shown in FIG. 1 and power supply circuit 10, shown in FIG. 3, is that the attainable, minimal voltage difference between the voltage at output 11 and the higher voltage of one of input-voltage sources 12a, 12b according to the embodiment shown in FIG. 3 is again less than according to the exemplary embodiment in FIG. 1. This is achieved by the omission of the voltage drop which unavoidably occurs at decoupling diodes 13a, 13b according to FIG. 1. The decoupling of input-voltage sources 12a, 12b is possible due to the use of first and second output transistors 26a, 26b. Accordingly, each input-voltage source 12a, 12b receives its own output transistor, both transistors 26a, 26b being connected to output 11.

It is possible to establish the voltage at output 11 by clamping control inputs 27a, 27b of output transistors 26a, 26b to predefined values with the assistance of the two voltage limiters 28, 29. Preferably, voltage limiters 28, 29 predetermine the same voltage.

The voltage difference occurring between output 11 and input-voltage source 12a, 12b is determined only by the voltage difference occurring in current mirror 15a, 15b, and by the voltage difference between control input 27a, 27b of output transistor 26a, 26b and output 11. On the other hand, the voltage difference occurring at output transistor 26a, 26b between output 11 and input-voltage source 12a, 12b is negligible, and thus does not increase the total voltage difference.

Figure 4:
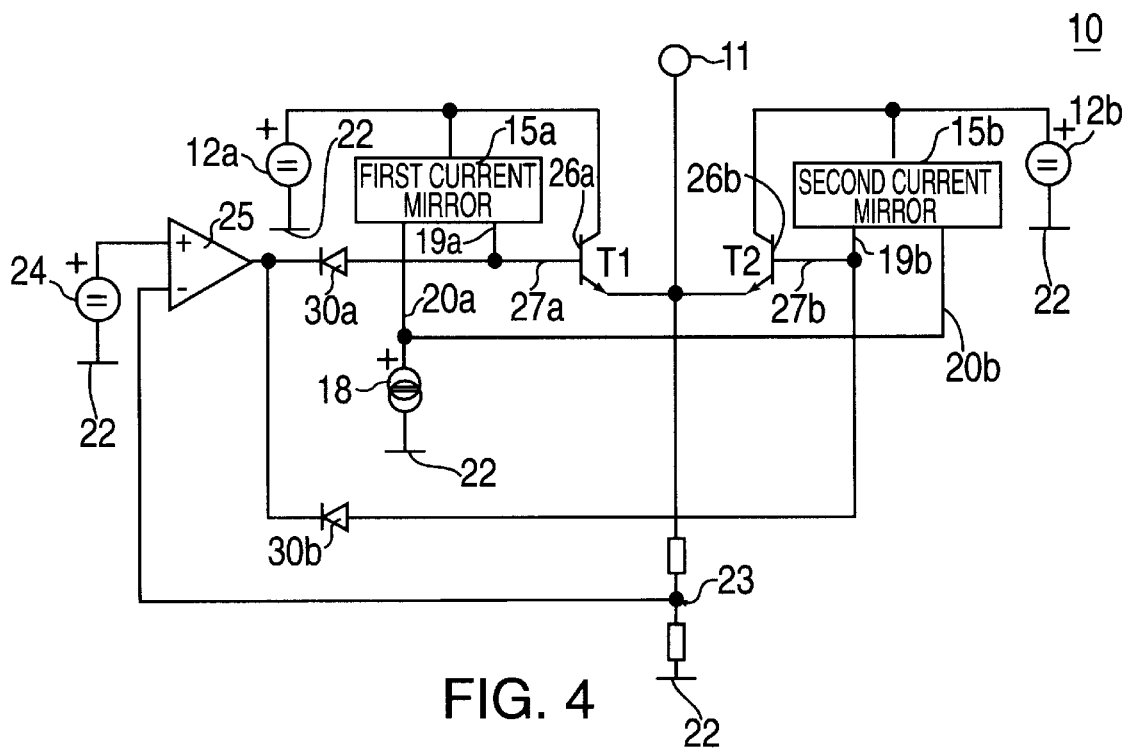
FIG. 4 show a circuit diagram of a fourth exemplary embodiment of the power-supply circuit according to the present invention.

FIG. 4 shows another embodiment of power-supply circuit 10 according to the present invention. Those parts shown in FIG. 4 which correspond with the parts shown in FIG. 3 are denoted in each case by the same reference numeral. Compared to power-supply circuit 10 of the present invention shown in FIG. 3, voltage limiters 28, 29 included there are replaced by voltage divider 23, reference-voltage source 24 and comparator 25 shown in FIG. 2. Since, compared to the exemplary embodiment shown in FIG. 2, provision is now made for separate output transistors 26a, 26b, a first further decoupling diode 30a and a further second decoupling diode 30b are needed. First further decoupling diode 30a connects comparator 25 to control terminal 27a of first output transistor 26a, and second further decoupling diode 30b connects comparator 25 to control input 27b of second output transistor 26b. Instead of the possibility shown in FIG. 3 of setting the voltage at output 11 to the voltage of first or second voltage limiter 28, 29, according to the embodiment shown in FIG. 4, a closed-loop control of the voltage at output 11 to the value set by reference voltage 24 is possible. The resulting closed control loop can be designed in light of the control performance sought, and permits a high constancy of the voltage at output 11.

What is claimed is:

1. A power-supply circuit, comprising:
   an output transistor;
   decoupling diodes;
   a current source generating a source current;
   at least two input-voltage sources interconnected at the output transistor via the decoupling diodes; and
   a plurality of current mirrors, an input of each of the current mirrors being coupled to a respective one of the at least two input-voltage sources, each of the current mirrors providing a respective output mirror current at a control input of the output transistor using the source current.

2. The power-supply circuit according to claim 1, wherein the control input of the output transistor receives a voltage which is set to a predetermined value.

3. The power-supply circuit according to claim 2, further comprising:
   a limiter diode establishing the voltage at the control input of the output transistor.

4. The power-supply circuit according to claim 2, further comprising:
   a closed control loop arrangement stabilizing an output voltage at an output of the power-supply circuit, the closed control loop arrangement including a comparator and a reference-voltage source.

5. The power-supply circuit according to claim 1, wherein the decoupling diodes include bipolar diodes.

6. The power-supply circuit according to claim 1, wherein the output transistor is an NPN transistor.

7. A power-supply circuit, comprising:
   a plurality of output transistors, each of the output transistors including a control input;
   a current source generating a source current;
   a plurality of current mirrors; and
   at least two input-voltage sources interconnected at an output of the power-supply circuit via the output transistors, each of the output transistors being allocated to a respective one of the input-voltage sources, an input of a respective one of the current mirrors being coupled to the respective one of the input-voltage sources, each one of the current mirrors providing a respective output mirror current at the control input of the respective one of the output transistors which is allocated to the respective one of the input-voltage sources coupled to the input of the one of the current mirrors.

8. The power-supply circuit according to claim 7, wherein the control input receives a voltage which is set to a predetermined value.

9. The power-supply circuit according to claim 8, further comprising:
   a limiter diode establishing the voltage at the control input.

10. The power-supply circuit according to claim 8, further comprising:
    a closed control loop arrangement stabilizing an output voltage at the output of the power-supply circuit, the closed control loop arrangement including a comparator and a reference-voltage source.

11. The power-supply circuit according to claim 7, wherein at least one of the output transistors is an NPN transistor.

12. The power-supply circuit according to claim 1, wherein the at least two input-voltage sources are interconnected at a collector of the output transistor via the decoupling diodes.

* * * * *